United States Patent
Krata et al.

(10) Patent No.: US 9,395,722 B2
(45) Date of Patent: Jul. 19, 2016

(54) METHOD FOR PROTECTING A SYNCHRONOUS MACHINE AGAINST DAMAGE CAUSED BY POLE SLIPPING

(75) Inventors: Jaroslaw Krata, Mazowiecki (PL); Arkadiusz Burek, Wieliczka (PL)

(73) Assignee: ABB TECHNOLOGY AG, Zurich (CH)

( * ) Notice: Subject to any disclaimer, the term of this patent is extended or adjusted under 35 U.S.C. 154(b) by 529 days.

(21) Appl. No.: 13/883,807

(22) PCT Filed: Oct. 17, 2011

(86) PCT No.: PCT/EP2011/005239
§ 371 (c)(1),
(2), (4) Date: May 7, 2013

(87) PCT Pub. No.: WO2012/065666
PCT Pub. Date: May 24, 2012

(65) Prior Publication Data
US 2013/0231783 A1  Sep. 5, 2013

(30) Foreign Application Priority Data

Nov. 15, 2010 (EP) .................................... 10460041

(51) Int. Cl.
*G05B 23/02* (2006.01)
*H02P 9/10* (2006.01)

(52) U.S. Cl.
CPC ............... *G05B 23/027* (2013.01); *H02P 9/10* (2013.01)

(58) Field of Classification Search
CPC ................................ H02P 9/10; G05B 23/027
USPC ........................................................ 700/275
See application file for complete search history.

(56) References Cited

U.S. PATENT DOCUMENTS

| 8,278,883 B2 | 10/2012 | Dalby ............................ 322/20 |
| 2011/0013676 A1* | 1/2011 | Fukushima .............. H02H 3/30 375/211 |

OTHER PUBLICATIONS

Redfern et al., A New Pole Slipping Protection Algorithm for Dispersed Storage and Generation Using the Equal Area Criterion, 1995 IEEE.*
Redfern et al., A New Pole Slipping Protection Algorithm for Dispersed Storage and Generation Using the Equal Area Criterion.*
*A Study Into a New Solution for the Problems Experienced With Pole Slipping Protection*; Redfern et al.; IEEE Transactions on Power Delivery, IEEE Service Center, NY, US, vol. 13, No. 2, Apr. 1, 1998; pp. 394-404.

(Continued)

*Primary Examiner* — Mohammad Ali
*Assistant Examiner* — John Park (57) ABSTRACT

A method for protecting a synchronous machine (2) against damage caused by pole slipping in a power generating unit or a drive unit (1) in an electric power network is disclosed. The method measures signals of current and voltage of the synchronous machine (2) and assumed constant parameters to determine a disturbance (Trig_start). When a disturbance is detected, an indicator of pole slipping is determined, and the time of rotor operation with the occurrence of pole slipping is totalized. Next, if a threshold value allowed for the rotor operation with slipping proves to be valid, corresponding measures protecting the synchronous machine (2) against slipping are implemented. If the detection process is not fulfilled, the process of sudden disturbance and/or the process of accrued detection is conducted until the criterion of pole slipping occurrence is fulfilled for the generator mode or for the motor mode.

7 Claims, 4 Drawing Sheets

(56) References Cited

OTHER PUBLICATIONS

*A Review of Pole Slipping Protection*; Redfern et al.; Oct. 4, 1996; pp. 6/1-6/9.

*Field Trials to Demonstrate the Performance of a New Pole Slipping Protection*; Redfern et al.; Developments in Power System Protection, 6th International Conference; Conf. Publ. No. 434); Nottingham, UK; Mar. 25-27, 1997; London, UK; IEEE, UK; pp. 44-47.

*A New Pole Slipping Protection Algorithm for Dispersed Storage and Generation Using The Equal Area Criterion*; Redfern et al.; IEEE Transaction in Industrial Application; vol. IA-23, No. 5; Sep. 1987; pp. 777-785.

International Search Report mailed Nov. 22, 2011 in corresponding application PCT/EP2011/005239.

Written Opinion mailed Nov. 22, 2011 in corresponding application PCT/EP2011/005239.

\* cited by examiner

METHOD FOR PROTECTING A SYNCHRONOUS MACHINE AGAINST DAMAGE CAUSED BY POLE SLIPPING

CROSS-REFERENCE TO RELATED APPLICATION

This is a §371 application of International patent application number PCT/EP2011/005239 filed Oct. 17, 2011, which claims the benefit of European patent application No. 10460041.6 filed on Nov. 14, 2010, and which are incorporated herein by reference.

TECHNICAL FIELD

The subject of the invention is a method for protecting a synchronous machine against damage caused by pole slipping, applicable during the operation of the synchronous machine in a power generating unit or in a drive unit in an electric power network. The inventive method uses detection of pole slip caused by faults and voltage collapses, as well as one resulting from overload and excitation loss in a synchronous machine. The inventive method is applicable both in synchronous motors and synchronous generators.

BACKGROUND ART

Slipping of the rotor poles in a synchronous machine operating as a part of a power generating or drive unit can occur as a result of a delayed elimination of a fault in the electric power network or as a result of improper excitation of the synchronous machine. In consequence of successive pole slips, a synchronous machine may fall-out of synchronism with the electric power network. During a pole slip in the case of the generator-mode operation of a synchronous machine, oscillations of the rotor torque and fluctuations in active power delivered to the electric power network can occur. If the pole slip results from the loss of excitation, the mechanical and electrical effects can be negligible, but if the phenomenon has occurred with full excitation, then its effects can be harmful for the generator itself and for the electric power network. Moreover, considerable changes in active power during pole slipping are accompanied by voltage fluctuations on the output terminals of the synchronous generator.

A method for measuring the load angle, also known as the power angle, and a method for detecting pole slipping in a synchronous generator, based on the values of the load angle, is known from patent application WO2008/102105. That method is realized by measuring the value of the load angle of the synchronous generator working in a unit containing an exciter and a machine with permanent magnets which excites the exciter, and it is provided with with a device for measuring the voltage induced in the stator of the machine with permanent magnets and a device measuring voltages induced in the stator of the synchronous generator, as well as a device for comparing the measured voltage waveforms. In the presented unit, the load angle is measured by means of comparators and the measurement consists in comparing the phase displacement of the voltage waveforms of the generator stator with the voltage waveform of the rotor of the machine with permanent magnets. In order to make the comparison, both voltages are transformed from sinusoidal waveform to the form of a rectangular signal, and then the phase displacement between them is measured. Next, the load angle is calculated using the values of the phase displacement, and after that the value of the load angle is compared to the reference value which is determined for the synchronous generator, and changes in the load angle over time are calculated. If the value of the load angle exceeds the reference value, this will directly indicate a possible detection of a pole slip in the synchronous generator. If pole slipping is detected, an appropriate alarm signal will be sent to the device that controls the generator to take further measures consisting in opening the generator circuit breaker and instantly switching the generator off. The change in the value of the load angle over time is used as the indicator of the occurrence of pole slipping. If a sudden change in the value of the load angle which is bigger than the predetermined threshold value is detected, an appropriate alarm signal will be sent to the device that controls the operation of the generator and further action will be taken resulting in switching the generator off. The accuracy of the pole slipping phenomenon detection depends directly on the reference value which is determined separately for different types of synchronous generators. The accuracy of load angle measurement depends on the accuracy of instruments used for measuring voltages induced in the stator of the machine with permanent magnets and voltages induced in the stator of the synchronous generator, or the device that compares the measured voltage waveforms. In the presented method, the detection of the slipping phenomenon in a synchronous generator depends on the type of the exciter used for exciting the generator, and in the case of synchronous generators which contain exciting equipment other than that presented in the described method, it cannot be achieved. If there is no voltage signal from the stator of the machine with permanent magnets which excites the exciter, the comparison between such signal with the signal of the voltage waveform of the generator stator cannot be done.

In two publications, first wrote by Redfern M. A., Checksfield M. J.: "A new pole slipping protection algorithm for dispersed storage and generation using the equal area criterion", IEEE Transaction in Industrial Application, Vol IA-23, No. 5, September 87. pp 777-785. and second wrote by Redfern M. A., Checksfield M. J., H. T. Yip, "Field Trials to Demonstrate the Performance of a new Pole Slipping Protection" Developments in Power System Protection 25-27 Mar. 1997, Conf. Pub, No. 434 pp. 44-47, the method for protecting a synchronous machine against damage caused by rotor pole slipping is presented.

In these publications the power based method of pole slipping of synchronous generators operating in parallel with a utility supply system is presented. The method uses three phase reactive power Q, three phase active power P, and rate dP/dt of change of active power in order to detect operation past the Critical Stability Point. Reactive power Q is used to tell if the generator is operating at load angles of greater than 90'. The reactive power Q trip level, Qtrip is calculated from a quadrature axis synchronous reactance Xq, and is entered as an external setting. The active power trip level Pt is automatically adjusted according to the generator operating point. The rate of change of power trip setting is also continuously adjusted according to the generator operating point. The 1.5 power system cycle time constraint is introduced to ensure that the method remains stable during short circuit faults. The majority of faults will not satisfy all of the trip criteria, but the few that do only cause the criteria to be satisfied for less than one power system cycle. The method uses the generator parameters, the quadrature axis synchronous reactance Xq, the direct axis transient reactance Xd, along with the generator rating Sgen, and generator operating point to derive the trip levels. By dynamically adjusting the trip settings according to the current operating point, the method can use sensitive trip levels to quickly detect pole slips which occur due to steady state or dynamic instability. During transient disturbances, larger trip levels are automatically used, ensuring that there are no false trips during stable power swings.

Similar method is presented in publication Redfern M. A., Checksfield M. J., "A study into a new solution for the problems experienced with pole slipping protection", IEEE Transaction on Power Delivery, Vol. 10, No. 2, April 98. pp. 394-404. The only difference from the two previous presented publication is in different approach in calculation an equation for Qtrip, where Qtrip is a threshold levels for reactive power Q.

SUMMARY OF THE INVENTION

The essence of the method for protecting a synchronous machine which is a part of a power generating or drive unit against damage caused by rotor pole slipping is that measured signals of current and voltage of the synchronous machine and assumed permanent parameters are the basis for determining a binary logical indicator of disturbance occurrence Trig_start, which depends on the active power waveforms, at a specific sampling frequency $f_s$, for which the criterion of disturbance occurrence proves to be valid, which when fulfilled means that pole slipping can occur. Then a binary logical indicator of pole slipping PS_det, for which the criterion of occurrence of a pole slipping proves to be valid for the generator mode or the drive mode is determined, which criterion when fulfilled, the time of rotor operation with the occurrence of pole slipping is totalized. A binary logical indicator of the decision about the activation PS_trip for which the criterion of exceeding a threshold value allowed for rotor operation with slipping proves to be valid is determined, which criterion when fulfilled, automatically activates measures protecting the synchronous machine against slipping. If, in the course of execution of the disturbance occurrence detection process, the disturbance occurrence criterion is not fulfilled within a defined time, the process of sudden disturbance detection and/or the process of accrued disturbance detection are/is conducted. Both processes are conducted until the criterion of pole slipping occurrence is fulfilled for the generator mode or for the motor mode, after which further actions are continued as previously. The process of detecting a sudden disturbance is executed by verifying the truth of the criterion of occurrence of sudden disturbance which is fulfilled when the following logical relation is fulfilled:

$$(|lower(t_k)|>|P(t_k)|) \lor (|upper(t_k)|<|P(t_k)|) \Leftrightarrow t_{k1}=t_k$$
$$\Leftrightarrow \Leftrightarrow \text{sudden disturbance}|_{t_{k1}}=1$$

where:
$|P(t_k)|$—is the absolute value of active power at the instant $t_k$,
$|lower(t_k)|$—is the absolute value of the lower envelope calculated for averaged active power,
$|upper(t_k)|$—is the absolute value of the upper envelope calculated for averaged active power.
$t_{k1}$—is the time instant of the detection of a sudden disturbance.

The process of detecting an accrued disturbance is executed by verifying the truth of the criterion of occurrence of accrued disturbance, which is fulfilled when the following logical relation is fulfilled:

$$(|P(t_k)|-|P_{before}(t_{k-N3})|)>N4 \Leftrightarrow t_{k2}=t_k \Leftrightarrow \Leftrightarrow \text{accrued disturbance}|_{t_{k2}}=1$$

where:
$|P(t_k)|$—is the absolute value of active power at the instant $t_k$,
$|P_{before}(t_{k-N3})|$—is the absolute value of averaged active power at an instant which is at a distance equal to the value of N3 samples from the instant $t_k$, this value being determined by the user,
N4—is the maximum steepness of the edge of active power, determined by the user,
$t_{k2}$—is the time instant of the detection of an accrued disturbance.

Preferably, the disturbance occurrence criterion is fulfilled when the binary logical indicator of disturbance occurrence Trig_start takes on the logical value equal to 1, which means true.

Preferably, the criterion of the occurrence of pole slipping for the generator mode or for the motor mode is fulfilled when the following logical relations are fulfilled respectively:

for the generator mode of operation:

$$(P(t_k)>P_{bef\_latch}) \land (Q(t_k)<Q_{trip\_level}(t_k))$$

for the motor mode of operation:

$$(P(t_k)<P_{bef\_latch}) \land (Q(t_k)<Q_{trip\_level}(t_k))$$

where:
$P(t_k)$—is the value of active power at the instant $t_k$,
$P_{bef\_latch}$—is the value of average active power prior to the occurrence of the disturbance,
$Q(t_k)$—is the value of reactive power at the instant $t_k$,
$Q_{trip\_level}(t_k)$—is the threshold value of the permissible reactive power at the instant $t_k$, Preferably, the criterion of exceeding the permissible threshold value for rotor operation with slipping is fulfilled when the time of operation totalized during the detected pole slipping exceeds the threshold value N7 determined by the user and when pole slipping has been detected.

Preferably, the computer measuring device executing the inventive method is a digital protection relay.

A system for protecting a synchronous machine which is a part of a power generating/drive unit against damage caused by pole slipping, containing sensors for measuring current and voltage, and a computer measuring device, characterized in that it contains a disturbance detection module, a pole slipping detection module and a decision-making module, which being implemented in the memory of the computer device execute the method according to claims 1-5.

A computer program for protecting a synchronous machine which is a part of a power generating or drive unit against damage caused by pole slipping, which is loadable into and executable in a computer measuring device, characterized in that during program run it executes the method according to claims 1-5.

The advantage of the inventive method is a considerable facilitation in the execution of the process of detecting pole slipping, consisting in measuring the current and voltage of the stator of the synchronous machine and analyzing the voltage and current waveforms of the stator of the synchronous machine in order to calculate the active and reactive power of the synchronous machine. The inventive method is independent from the type of the exciter and it is executed for any type of synchronous generators. The inventive method allows to avoid the measurement of the load angle and offers independence from the rate of changes in the load angle over time. The use of only the measurements of active power and reactive power, as the necessary condition for a proper detection of pole slipping in a synchronous machine, largely facilitates and simplifies the detection of pole slipping in a synchronous machine. In addition, the system for the execution of the inventive method makes it possible to use a simple measuring system.

BRIEF DESCRIPTION OF THE DRAWINGS

The inventive method is presented as an embodiment in the drawing where FIG. 1 shows schematically the system for the execution of the invention, FIG. 2—the sequence of actions performed to execute the method, FIG. 3—a diagram of active and reactive power waveforms during the detection of pole slipping with the occurrence of a sudden disturbance, including the binary values of the indicators Trig_start, PS_det and PS_trip, and FIG. 4—a diagram of active and reactive power waveforms during the detection of pole slipping with the occurrence of an accrued disturbance, including the binary values of the indicators Trig_start, PS_det and PS_trip,

BEST MODE FOR CARRYING OUT THE INVENTION

Figure 1:
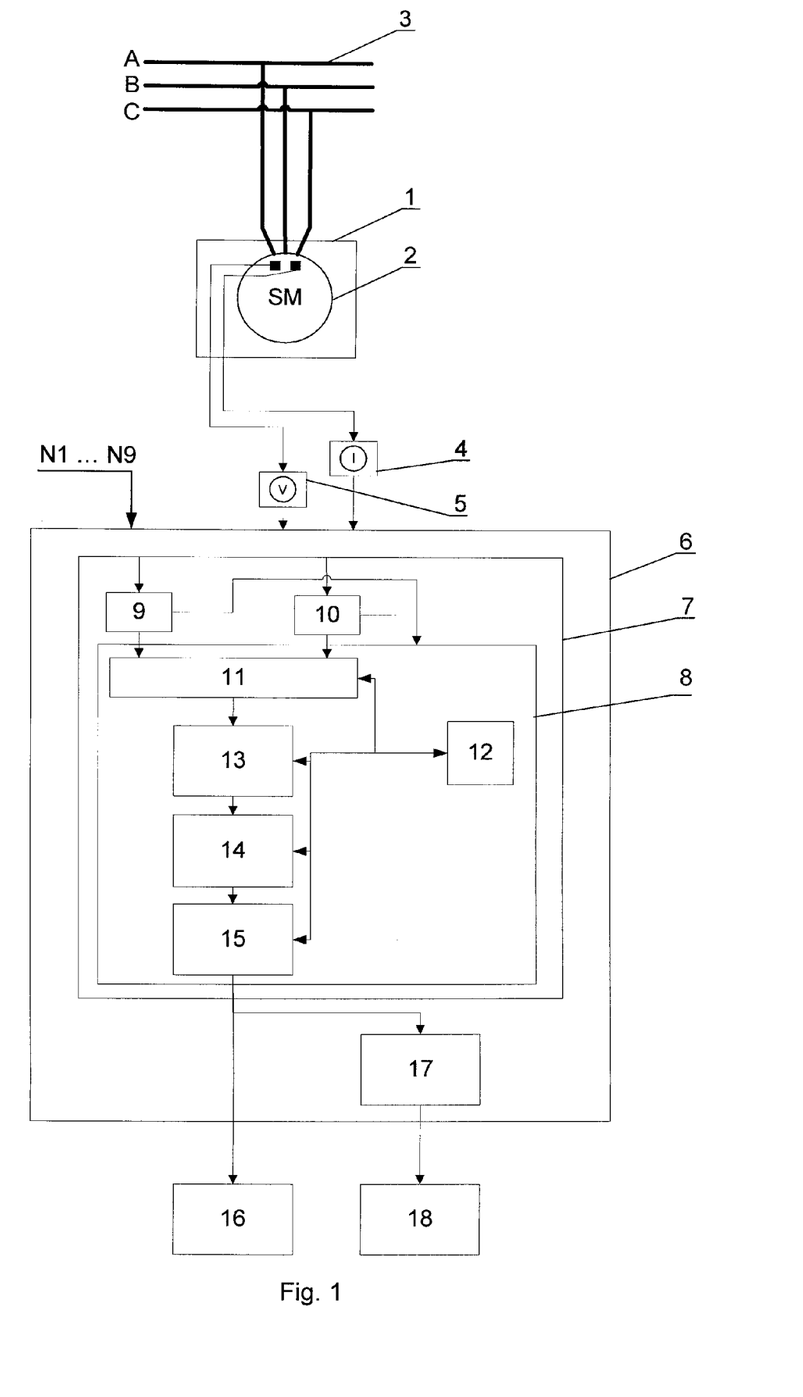

The inventive method is based on the measurement of the voltage and current of the synchronous machine which is a part of a power generating/drive unit and which is tested under load, and on the use of the active and reactive power waveforms of the synchronous machine for detecting the pole slip phenomenon. The tested power generating or drive unit 1 includes a synchronous machine 2 in the form of a motor or a synchronous generator which is connected to a three-phase electric power network 3, in which the subsequent phases are designated by the symbols A, B and C. The synchronous machine 2, which is a part of the power generating/drive unit 1, is provided with at least one sensor for measuring current 4 for the three phases A, B and C and with at least one sensor for measuring voltage 5 of the three phases A, B and C. The sensors 4 and 5 are connected with a computer measuring device 6 comprising a processor 7 with a memory 8 and with a number of functional modules, such as: a module for reading-in and storing the constant parameters 9 of the synchronous machine which is a part of the power generating/drive module 1 and a module for reading-in the measured values of variable parameters 10. The memory 8 contains a number of other functional modules: a computing module 11 used for converting the measured current and voltage values into waveforms representing the active power values and reactive power values, and also for calculating indirect parameters necessary in the invention execution process, a module for comparing the stored and calculated data 12, a disturbance detection module 13, a pole slipping detection module 14 and a decision-making module 15. The decision-making module 15 is linked with an external results visualization device 16 and an alarm module 17 used to send information to the final control element 18 which protects the synchronous machine 2 against harmful effects of the occurrence of the pole slipping phenomenon. The final control element 18 is usually a suitable circuit breaker. The visualization device 16 can be an element of the computer device 6, which is not shown in the drawing. The computer measuring device 6 is usually a digital protection relay.

Figure 2:
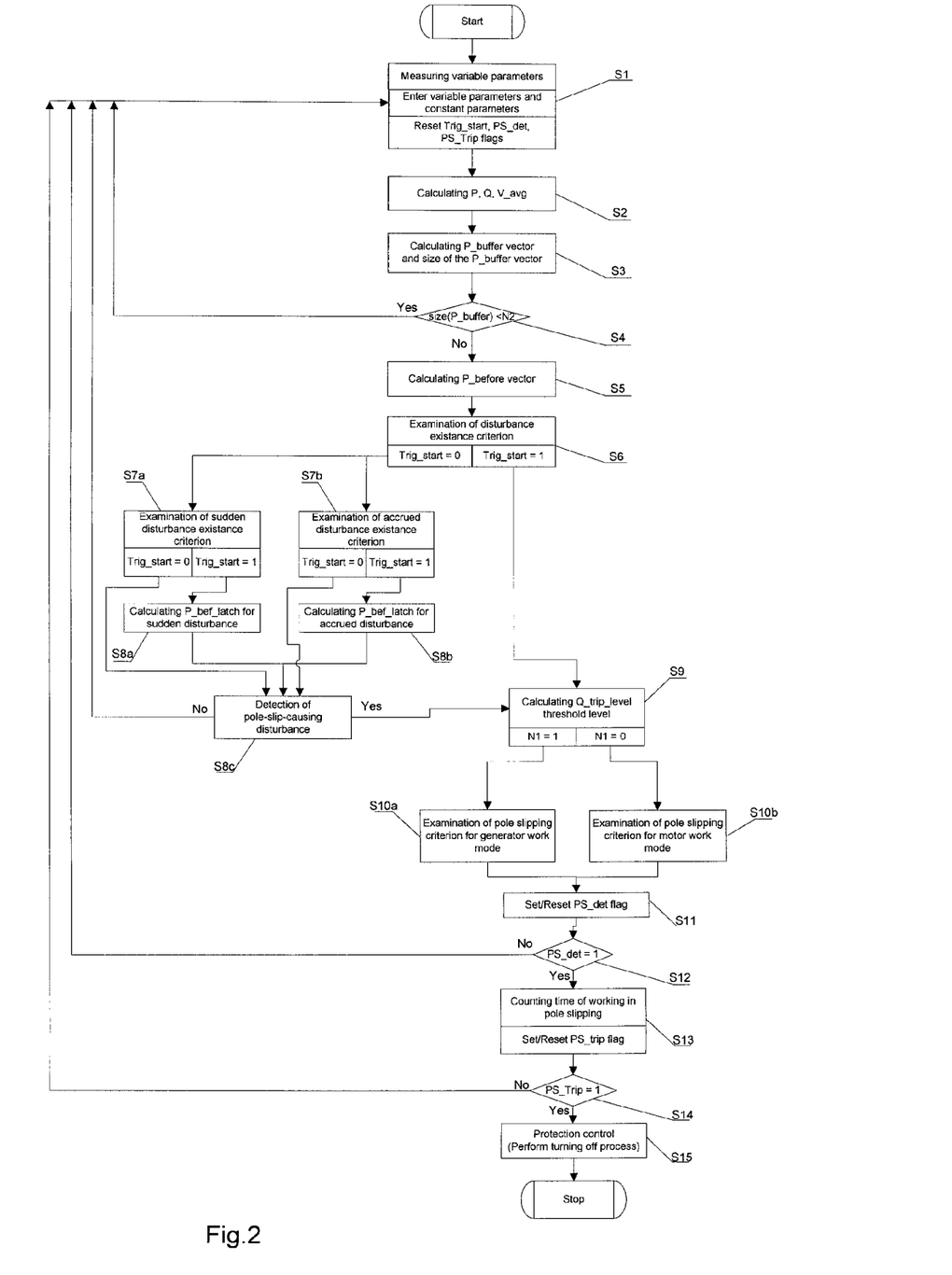

An example of the invention execution process is shown in the following steps S1 through S15.

Step S1

In step one S1, the user enters the permanent data and the variable i.e. measured data to the computer measuring device 6 which is connected to the synchronous machine 2 which is a part of the power generating/drive unit 1. The permanent data, i.e. settings N1 through N9 relate to the operating conditions of the synchronous machine 2 and to the method of executing the measurement, and they are presented in Table 1.

TABLE 1

| | |
|---|---|
| N1 | The setting informing about the operating status of the synchronous machine, either the motor/drive operation status (N1 = 0) or the generator/power generating operation status (N1 = 1) |
| N2 | The setting defining the number of samples for the observation of active power for the determination of a sudden disturbance causing pole slipping. |
| N3 | The setting defining the number of samples for the observation of active power for the determination of an accrued disturbance, and also the number of the elements of the active power vector when determining the sudden disturbance causing pole slipping. |
| N4 | The maximum admissible steepness of the edge of active power which does not cause detection of an accrued disturbance. |
| N6 | The value of zone of insensitivity to variations in active power for determining the sudden disturbance causing pole slipping. |
| N7 | The maximum permissible time of operation of the machine in a pole slipping condition. |
| N8 | Longitudinal synchronous reactance. |
| N9 | Sampling frequency $f_s$ of the samples of the current signal and the voltage signal. |

The parameters presented in Table 1 are read-in and stored in the module for reading-in and storing the constant parameters 9 of the synchronous machine 2 which is a part of the power generating/drive unit 1.

The permanent data relate to the values of current and voltage signals measured for each of the phases A, B and C by means of the sensors 4 and 5 located on the synchronous machine 2. The measured voltage and current values are read in the module for reading-in and storing the measured values of variable parameters 10, they undergo sampling with the sampling frequency $f_s$, defined by the setting N9 and they are stored in the form of waveforms for all phases A, B and C of the synchronous machine 2 which is a part of the power generating/drive unit 1.

In addition to permanent and variable parameters, in step S1, flags with an initial value equal to 0 are loaded and stored in the memory 8. During the execution of the method, flags take on the values 0 or 1, where 0 means false and 1 means true.

The following flags are stored:
Trig_start=a logical indicator of the occurrence of a disturbance, then used in steps S6, S7a, S7b and S8c,
PS_det=a logical indicator of the occurrence of a pole slip, then used in steps S11, S12 and S13,
PS_trip=a logical indicator of the decision about intervention, then used in steps S13, S14.

Step S2

In step S2, in the computing module 11, the phasors of phase-to-phase voltage between phases A and B, between phases A and C, between phases B and C, as well as current phasors for two phases, for example for phase B and phase C, are determined from the stored waveforms, after which the values of the following functions and mathematical relations are calculated:

a) apparent power $S(t_k)$ whose value is calculated according to this relation:

$$S(t_k) = \frac{V_{ab}(t_k) \cdot conj(I_b(t_k)) + V_{ac}(t_k) \cdot conj(I_c(t_k))}{2}, \quad (1)$$

where:
$V_{ab}$—is the phasor of phase-to-phase voltage between phases A and B, $V_{ac}$—is the phasor of phase-to-phase voltage between phases A and C,
$I_b$—is the current phasor of phase B,
$I_c$—is the current phasor of phase C,
$t_k$—is the tested run time of the sampled functions, such that:

$$t_k \in \left\{ t : t = \frac{k}{f_s}, k \in Z_+ \cup \{0\}, \right\}$$

where:
k—is indexing,
$f_s$—is sampling frequency determined by setting N9,
$Z_+$—is the set of positive integers,
b) active power $P(t_k)$ whose value is calculated as a real part of apparent power $S(t_k)$:

$$P(t_k) = \text{real}(S(t_k)), \tag{2}$$

c) reactive power $Q(t_k)$ whose value is calculated as the negative imaginary part of apparent power $S(t_k)$:

$$Q(t_k) = -\text{imag}(S(t_k)), \tag{3}$$

d) the average value of the measured voltage $V_{avg}(t_k)$, which is calculated according to this relation:

$$V_{avg}(t_k) = \frac{\text{abs}(V_{ab}(t_k)) + \text{abs}(V_{bc}(t_k)) + \text{abs}(V_{ac}(t_k))}{\sqrt{2} \cdot \sqrt{3}}, \tag{4}$$

where:
$V_{ab}$—is the phasor of phase-to-phase voltage between phases A and B,
$V_{ac}$—is the phasor of phase-to-phase voltage between phases A and C,
$V_{bc}$—is the phasor of phase-to-phase voltage between phases B and C.

The received results of measurements, i.e. the dependent variables of active power $P(t_k)$, the dependent variable of reactive power $Q(t_k)$ and the average values of the measured voltage $V_{avg}(t_k)$ are stored in the memory 8 and are used in further steps of the inventive method.

Step S3

In step S3, the vector of active power $P_{buffer}|t_k$ which is a set of elements whose first element is the value of active power corresponding to the time instant which is at a distance equal to N2 samples from the instant $t_k$, and the last element is the value of active power $P(t_k)$, which is defined by the following relation:

$$P_{buffer}|t_k = [P(t_{k-N2}), P(t_{k-N2+1}), \ldots, P(t_{k-N2+N2+1}), P(t_k)], \tag{5}$$

where:
$P(t_k)$—is active power,
N2—is the setting N2 loaded to the computing module 11 from the module for reading-in and storing the constant parameters 9,
$P(t_{k-N2})$—is active power at a time instant which is N2 samples distant from time $t_k$. Moreover, in step S3, the number of the elements of vector $P_{buffer}|t_k$ is totalized.

Step S4

In step S4, the previously totalized number of elements of the vector $P_{buffer}|t_k$ is compared with the value of the setting N2. If the comparison shows that the number of stored active power samples in the vector $P_{buffer}|t_k$ is less than the value of the setting N2, then the computing cycle is repeated from step S1 to step S4, the cycle being run iteratively until a result is obtained for which the number of the elements of the vector $P_{buffer}|t_k$ is equal to the value of the setting N2, and then the execution of the method proceeds to the next step S5.

Step S5

In step S5, the vector of the averaged value of active power $P_{before}|t_k$ is calculated in the computing module 11.

In order to do it, first the value of averaged active power $P_{before}(t_k)$ is calculated according to this relation:

where:

$$P_{before}(t_k) = \frac{1}{N2} \cdot \sum_{i=1}^{N2} (P_{buffer}(i) | t_k), \tag{6}$$

$P(t_k)$—is active power in the time instant $t_k$,
N2—is the setting N2 loaded into the computing module 11 from the module for reading-in and storing the constant parameters 9,
$P_{buffer}(i)|t_k$—is the $i^{th}$ element of the vector of active power $P_{buffer}|t_k$, calculated in step S3.

Then the vector of active power $P_{before}|t_k$ is calculated. It is a set whose first element is the value of averaged active power $P_{before}(t_k)$ corresponding to the time instant which is at a distance equal to N3 samples, and the last element is the value of averaged power, and which is defined by the following relation:

$$P_{before}|t_k = [P_{before}(t_{k-N3}), P_{before}(t_{k-N3+1}) \ldots, P_{before}(t_{k-N3+N3+1}), P_{before}(t_k)] \tag{7}$$

where:
N3—is the setting N3 loaded into the computing module 11 from the module for reading-in and storing the constant parameters 9,
$P_{before}(t_{k-N3})$—is the first element of the vector $P_{before}|t_k$.

Step S6

In step S6, the process of disturbance detection is executed in the disturbance detection module 13.

In order to detect a disturbance, first the value of the disturbance flag Trig_start is checked. If it is found that the flag Trig_start has the logical value 1, this means that a disturbance occurred in the course of execution of the process, which disturbance may cause pole slipping, and then we proceed to step S9. If the flag Trig_start has the logical value equal to "0", the action is started with the purpose of detecting a sudden disturbance (S7a) and/or detecting an accrued disturbance (S7b).

Step S7a

In step S7a it is checked if the criterion of sudden disturbance is fulfilled and the time instant $t_{k1}$ of the occurrence of the sudden disturbance is determined. This purpose is achieved by calculating the value of the upper envelope upper $(t_k)$ for the previously calculated averaged value of active power $P_{before}(t_k)$ using the value of the setting N6 defined by the user, according to this relation:

$$\text{upper}(t_k) = (1 + N6) \cdot P_{before}(t_k) \tag{8}$$

and the value of the lower envelope lower$(t_k)$ for the previously calculated averaged value of active power $P_{before}(t_k)$ using the value of the setting N6, according to this relation:

$$\text{lower}(t_k) = (1 - N6) \cdot P_{before}(t_k) \tag{9}$$

Next, after calculating the value of both envelopes, it is checked if the value of active power $P(t_k)$ is bigger than the value of the lower envelope lower$(t_k)$ or if it is lower than the value of the upper envelope upper($t_k$), i.e. if the following logical relation is fulfilled:

$$(|lower(t_k)|>|P(t_k)|) \vee (|upper(t_k)|<|P(t_k)|) \Leftrightarrow t_{k1}=t_k \Leftrightarrow \Leftrightarrow \text{sudden disturbance}|_{t_{k1}}=1 \quad (10)$$

then sudden disturbance is considered to be occurring. In such case the flag Trig_start takes on the value 1. The logical record of the occurrence of a sudden disturbance is presented as the following relation:

$$\text{Trig\_start}=1 \Leftrightarrow (\text{sudden disturbance}|_{t_{k1}}=1) \quad (11)$$

Figure 3:
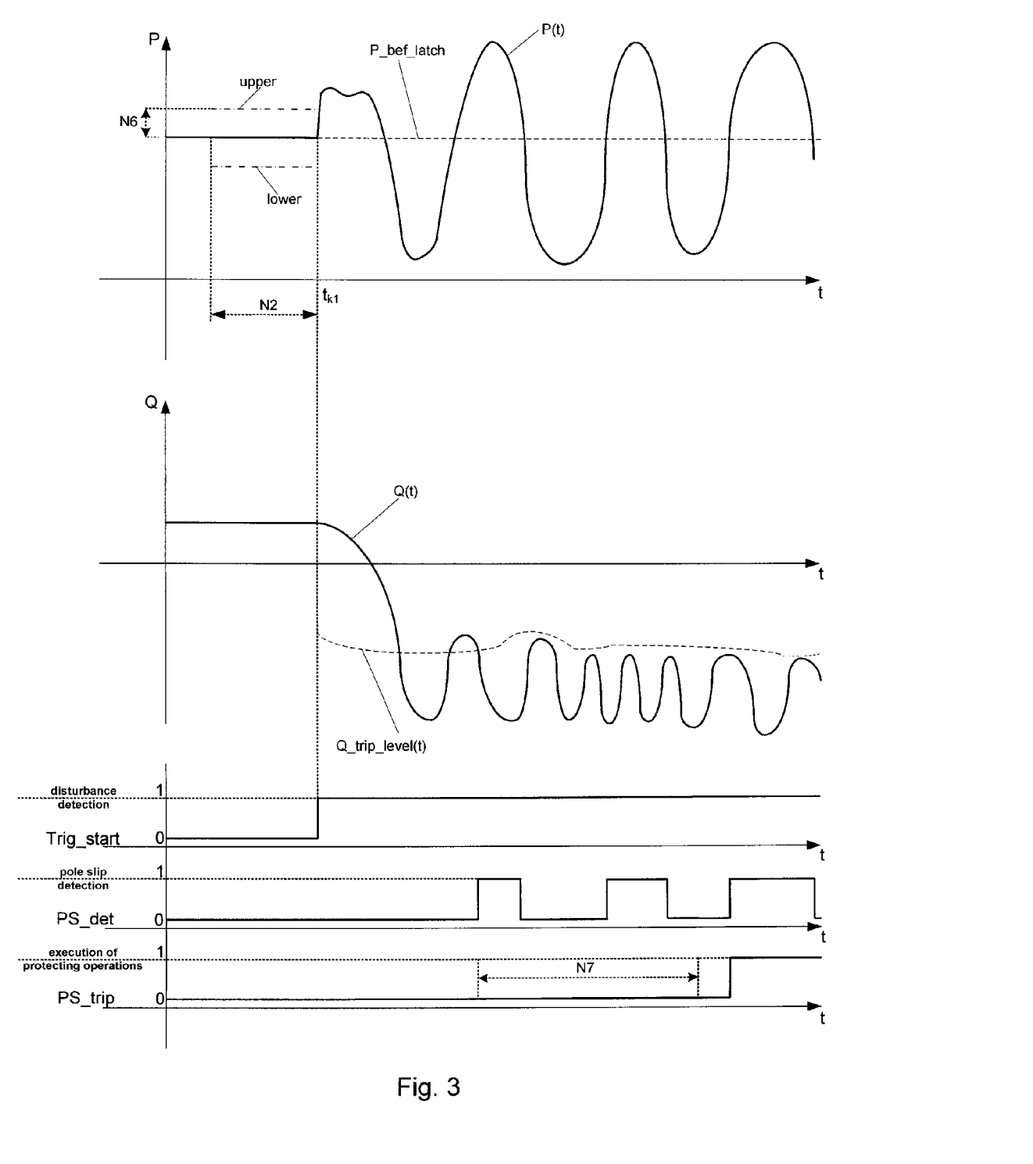

After setting the flag Trig_start to the value equal to 1 we proceed to step S8a. A diagram of an example of the process of sudden disturbance detecting is illustrated in FIG. 3.

If the action in step S7a does not result in the detection of a sudden disturbance, we proceed to step S8c, passing over the step S8a.

Step S8a

In step S8a, the value of average active power before the occurrence of the disturbance $P_{bef\_latch}$ is calculated according to the following relation:

$$P_{bef\_latch}=P_{before}(t_{k1}) \quad (12)$$

The calculated value $P_{bef\_latch}$ is stored and the program proceeds to step 8c. The stored value $P_{bef\_latch}$ is used in step S10a and S10b.

Step S7b

In step S7b, it is checked whether the criterion of accrued disturbance is fulfilled and the time instant $t_{k2}$ of the occurrence of the accrued disturbance is determined. In order to do this, it is checked whether the difference in the value of active power $P(t_k)$ at the instant at the distance of N3 samples is bigger than the value of the setting N4 i.e. it is checked if the following logical relation is fulfilled:

$$(|P(t_k)|-|P_{before}(t_{k-N3})|)>N4 \Leftrightarrow t_{k2}=t_k \Leftrightarrow \Leftrightarrow \text{accrued disturbance}|_{t_{k2}}=1 \quad (13)$$

If the relation (13) is fulfilled, it means that an accrued disturbance has occurred. In such case the flag Trig_start takes on the value 1. The logical record of the occurrence of the accrued disturbance is presented as the following relation:

$$\text{Trig\_start}=1 \Leftrightarrow (\text{accrued disturbance}|_{t_{k2}}=1) \quad (14)$$

Having set the flag Trig_start to the value equal to 1 we move to the next step S8b.

Figure 4:
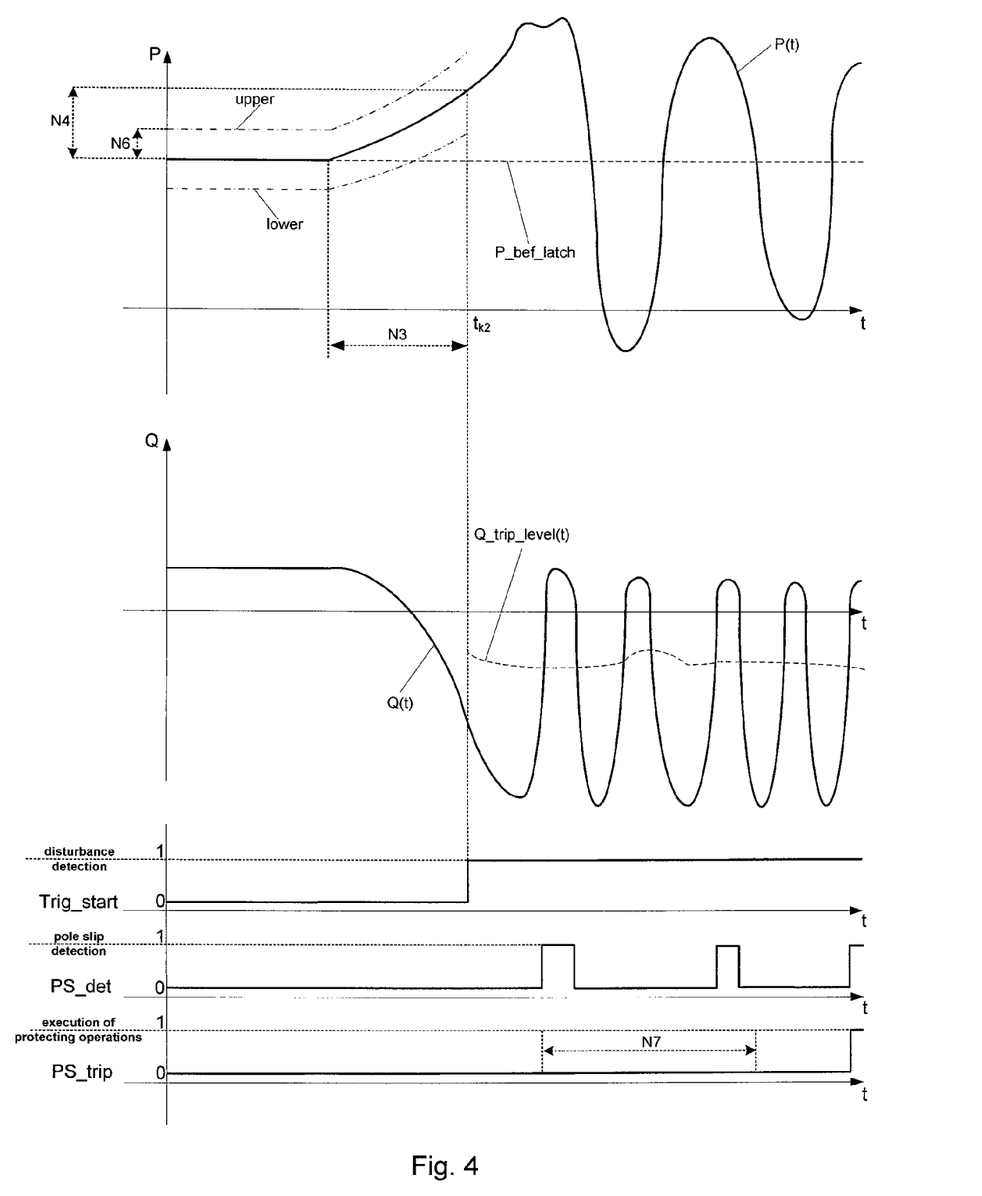

A diagram of an example of the process of accrued disturbance detecting is illustrated in FIG. 4.

If the action in step S7b does not result in the detection of a sudden disturbance, the program proceeds to step S8c, passing over the step S8b.

Step S8b

In step S8b the value of average active power before the occurrence of the disturbance $P_{bef\_latch}$ is determined according to the following relation:

$$P_{bef\_latch}=P_{before}(t_{k2-N3}) \quad (15)$$

The calculated value $P_{bef\_latch}$ is stored and we proceed to step 8c. The stored value $P_{bef\_latch}$ is used in step S10a and S10b.

Step S8c

If, during the verification of the criterion of occurrence of sudden disturbance and/or the criterion of accrued disturbance, the flag Trig_start has the value 0, which means that a disturbance which could cause pole slipping has not been detected, step S1 is repeated and a new set of input data is loaded and the sequence of the previous actions is repeated iteratively. If, as a result of the action in step S7a, the flag Trig_start has the value 1, it means that a sudden disturbance has been detected and the program proceeds to step S9, together with the value $P_{bef\_latch}$ calculated in step S8a. Similarly, if as a result of the action in step S7b the flag Trig_start has the value 1, an accrued disturbance has been detected and the program proceeds to step S9, together with the value $P_{bef\_latch}$ calculated in step S8b. If, on the other hand, as a result of the action in step S7a and S7b the flag Trig_start has been simultaneously set to the value 1, it is assumed that an accrued disturbance has occurred and the program proceeds to step S9 with the value $P_{bef\_latch}$ calculated in step S8b.

Step S9

When a sudden or accrued disturbance is detected, the threshold value of the permissible reactive power $Q_{trip\_level}$ ($t_k$) is calculated according to this relation:

$$Q_{trip\_level}(t_k) = -\frac{1}{2}\left(\frac{1}{N8}\right) \cdot (V_{avg}(t_k))^2, \quad (16)$$

where:

N8—is the setting N8 loaded to the computing module 11 from the module for reading-in and storing the constant parameters 9, $V_{avg}(t_k)$—is the average voltage value calculated in step S3 according to the formula (4).

Next, depending on the mode of operation fixed in step S1, the program proceeds to step S10a for the generator mode if N1=1 or to step S10b for the motor mode if N1=0.

Step S10a

In step S10a it is checked if the criterion of occurrence of pole slipping is fulfilled for the generator mode, the criterion being defined by the following relation:

$$(P(t_k)>P_{bef\_latch}) \wedge (Q(t_k)<Q_{trip\_level}(t_k)) \quad (17)$$

If the relation (17) is true, it means that pole slipping has been detected in the synchronous machine 2 which is a part of the power generating/drive set 1. If it is found that the relation (17) is not fulfilled, it means that pole slipping has not been detected. Having completed step S10b the program proceeds to step S11.

Step S10b

In step S10b it is checked whether the criterion of pole slipping is fulfilled for the motor mode. The criterion is defined by the following relation:

$$(P(t_k)<P_{bef\_latch}) \wedge (Q(t_k)<Q_{trip\_level}(t_k)) \quad (18)$$

If the relation (18) is true, it means that pole slipping has been detected in the synchronous machine 2 which is a part of the power generating/drive unit 1. If it is found that the relation (18) is not fulfilled, it means that pole slipping has not been detected. Having completed step S10b the program proceeds to step S11.

Step S11

In step S11, the value of the flag PS_det assumed in step S1—a logical indicator of the occurrence of pole slips (FIG. 3 and FIG. 4) is determined. If in step S10a or S10b the criterion of occurrence of pole slipping has been fulfilled, then the flag PS_det takes on the logical value 1. If the criterion in step S10a or S10b has not been fulfilled, then the flag PS_det takes on the value 0. Having completed step S11 the program proceeds to step S12.

Step S12

In step S11, the value of the flag PS_det is compared to the value 1 in the decision-making module 15. If the value PS_det is equal to 1, the next step s13 is executed, if not, the program returns to step S1 and the calculation cycle is performed from the beginning of this step.

Step S13

After the detection of the first pole slip, when the flag PS_det of a value equal to 1 appears for the first time in step S12, the time of rotor operation during pole slipping starts to be totalized in the decision-making module 15. If the value of the flag PS_det is 1 and when the time of operation totalized during the detected pole slipping exceeds the threshold value N7 defined by the user, then, in the inventive method, the flag PS_trip which is the logical indicator of the decision about trip action is set to the value 1 (FIG. 3 and FIG. 4). If the time of operation with pole slipping has not exceeded the value from the setting N7, or if after a time overrun with pole slipping the value of the flag PS_det is 0, the flag PS_trip maintains its value equal to 0.

Step S14

In step S14, it is checked in the decision-making module 15 if the indicator PS_trip has been set to the logical status "True". If no, the inventive method returns to step S1 in order to download a new set of input data and to start a new calculation cycle. If the flag PS_trip is set to the logical status "True" indicating the decision about trip action, then the process of detecting the pole slipping phenomenon ends and the program proceeds to the next step S15.

Step S15

In step S15, the synchronous machine 2 which is a part of the power generating/drive unit 1 is protected by the dispatch of the decision about the synchronous machine trip action to the final control element 18 and/or the result of the process of pole slip detection in the synchronous machine 2 is visualized by means of the results visualization device 16. The dispatch of the decision about trip action initiates also the transmission of a signal generated in the alarm module 17 and the automatic action of the final control element 18 which protects the synchronous machine 2 against damaging effects of the occurrence of the pole slipping phenomenon.

KEY TO THE DRAWING

1. Power generating/drive unit with a synchronous machine connected to the electric power network
2. Synchronous machine
3. Power network
4. Current sensor
5. Voltage sensor
6. Computer measuring device
7. Processor
8. Memory
9. Reading-in and storing the constant parameters module
10. Reading-in the measured values of variable parameters module
11. Calculation module
12. Stored and calculated data comparison module
13. Disturbance detection module
14. Pole slipping detection module
15. Decision-making module
16. Results visualization module
17. Module that sends the alarm signal to the final control element
18. Final control element

The invention claimed is:

1. A method for protecting a synchronous machine which is a part of a power generating or drive unit against damage caused by rotor pole slipping, consisting of detecting pole slipping in a synchronous machine and signaling an emergency condition or disconnecting the machine from an electric power network, using a computer measuring device for converting measured signals, using dependent variables of an active power $P(tk)$ and a reactive power $Q(tk)$, and calculated threshold levels for the active power $P(tk)$ and the reactive power $Q(tk)$, where $(tk)$ is a tested run time of a sampling of the measured signals, characterized in that based on measured signals of current and voltage of the synchronous machine and assumed permanent parameters, a Boolean value of disturbance occurrence (Trig_start) dependent on active power waveforms is determined at a predetermined sampling frequency $(f_s)$, such that a criterion of disturbance associated with the Boolean value of disturbance occurrence (Trig_start) is checked, and if said criterion of disturbance is fulfilled then pole slipping can occur then a Boolean value of pole slipping (PS_det) is determined, such that a criterion of occurrence of pole slipping associated with the Boolean value of the pole slipping (PS_det) checked for a generator mode or a drive mode such that if said criterion of pole slipping is fulfilled, then time of rotor operation with the occurrence of pole slipping is calculated and a Boolean value of a decision about trip action (PS_trip) is determined, such that a criterion of exceeding a threshold value allowed for the rotor operation with slipping associated with the Boolean value of the decision about trip action (PS_trip) is checked, and if said criterion of exceeding trip action is fulfilled, then measures protecting the synchronous machine against slipping are automatically activated, whereas if, in a course of execution of the Boolean value of disturbance occurrence detection process, after a defined time, said criterion of disturbance is not fulfilled, a process of a sudden disturbance detection and/or a process of an accrued disturbance detection is conducted, which processes are conducted until the criterion of occurrence of a pole slipping is fulfilled for the generator mode or for the motor mode, after which further actions are continued as previously, wherein the process of detecting a sudden disturbance is executed by verifying the truth of a criterion of occurrence of sudden disturbance is fulfilled when the following logical relation is fulfilled:

$$(|lower(t_k)|>|P(t_k)|) \lor (|upper(t_k)|<|P(t_k)|) \Leftrightarrow t_{k1}=t_k \Leftrightarrow \Leftrightarrow \text{sudden disturbance}|_{t_{k1}}=1$$

where:

$|P(t_k)|$—is an absolute value of active power at the tested run time instant $t_k$, $|lower(t_k)|$—is an absolute value of a lower envelope calculated for averaged active power, $|upper(t_k)|$—is an absolute value of an upper envelope calculated for averaged active power, and $t_{k1}$—is the time instant of the detection of a sudden disturbance, and wherein the process of detecting an accrued disturbance is executed by verifying a truth of a criterion of occurrence of accrued disturbance which is fulfilled when the following logical relation is fulfilled:

$$(|P(t_k)|-|P_{before}(t_{k-N3})|)>N4 \Leftrightarrow t_{k2}=t_k \Leftrightarrow \Leftrightarrow \text{accrued disturbance}|_{t_{k2}}=1$$

where:

$|P(t_k)|$—is the absolute value of active power at the tested run time instant $t_k$, $|P_{before}(t_{k-N3})|$—is an absolute value of averaged active power at an instant which is at a distance equal to the value of N3 samples from the tested run time instant $t_k$, this value being determined by the user, N4—is a maximum steepness of the edge of active power, determined by the user, and $t_{k2}$—is a time instant of the detection of the accrued disturbance.

2. A method according to claim 1, characterized in that the disturbance occurrence criterion is fulfilled when the binary logical indicator of disturbance occurrence (Trig_start) takes on a logical value equal to 1, which means true.

3. A method according to claim 2, characterized in that the criterion of the occurrence of pole slipping for the generator mode or for the motor mode is fulfilled when the following logical relations are fulfilled respectively:

for the generator mode of operation:

$$(P(t_k) > P_{bef\_latch}) \vee (Q(t_k) < Q_{trip\_level}(t_k))$$

for the motor mode of operation:

$$(P(t_k) < P_{bef\_latch}) \vee (Q(t_k) < Q_{trip\_level}(t_k))$$

where:
- $P(t_k)$—is a value of active power at the tested run time instant $t_k$,
- $P_{bef\_latch}$—is a value of average active power prior to the occurrence of the disturbance,
- $Q(t_k)$—is a value of reactive power at the tested run time instant $t_k$,
- $Q_{trip\_level}(t_k)$—is a threshold value of the permissible reactive power at the tested run time instant $t_k$.

4. A method according to claim 3, characterized in that the criterion of exceeding the permissible threshold value for rotor operation with slipping is fulfilled when the time of operation calculated during the detected pole slipping exceeds the threshold value N7 determined by the user and when pole slipping has been detected.

5. A method according to claim 1, characterized in that the computer measuring device is a digital protection relay.

6. A method for protecting a synchronous machine which is a part of a power generating/drive unit against damage caused by rotor pole slipping, according to claim 1, further comprising containing sensors for measuring current and voltage and a computer measuring device, characterized in that the computer measuring device contains a disturbance detection module, a pole slipping detection module, a decision-making module, which is implemented in a memory of the computer device.

7. A method according to claim 1, further comprising:
protecting a synchronous machine which is a part of a power generating or drive unit against damage caused by rotor pole slipping, by running a computer program which is loadable into and executable in the computer measuring device, characterized in that during program run it executes the method steps.

* * * * *